INVENTOR.
John C. McEwen
BY
A. M. Heiter
ATTORNEY

United States Patent Office 3,301,101
Patented Jan. 31, 1967

3,301,101
CUTTING STOP AND CHIP REMOVER
John C. McEwen, Indianapolis, Ind., assignor to General Motors Corporation, Detroit, Mich., a corporation of Delaware
Filed May 4, 1964, Ser. No. 364,482
11 Claims. (Cl. 77—55)

This invention relates generally to cutting stop and chip remover devices for cutting tools and more particularly to cutting stop and chip remover devices having safety and adjustment features especially adapted for use with rotary cutting tools.

Conventional cutting stops are generally fastened to and held in position on rotary cutting tools such as drills, reamers and taps by either friction engaging devices or spring loaded detent devices. Where the cutting stop position is dependent upon friction or releasable detent engagement with the cutting tool, any bumping of the cutting stop on the head of the guide bushing guiding the cutting tool or on the workpiece if such be the case may move the cutting stop out of its proper location without operator knowledge. As a result, it may be necessary to scrap several workpieces before the improper stop location is discovered.

The purpose of the cutting stop is, of course, to accurately control cutting depths in the workpiece. In addition to the problems presented by stop slippage, there is an additional problem presented in obtaining accurate cutting depths which results from the accumulation of chips between the cutting stop and the guide bushing head or workpiece.

A cutting stop and chip remover assembly according to this invention employs an adjustable stop collar which is secured to an anchor collar by threaded members which provide for cutting stop adjustment. The anchor collar is secured to the cutting tool which, for example, may be a drill by shear-away screws which engage the runout in the flute valley of the drill flutes. The cutting depth is determined by adjusting the stop collar relative to the cutting end of the drill by the threaded members which are then locked in position. The shear-away screws provide positive stoppage of the drill under normal conditions. If because of faulty automatic machine operation or operator inadvertence, the drill is forcibly fed past the normal limit which is determined by the stop collar engaging the head of the guide bushing where such is used, the shear-away screws shear with an audible report, release the cutting stop and chip remover assembly from the drill and warn the machine attendant or operator to stop the machine before more workpieces are ruined and before severe damage occurs.

To prevent chip accumulation between the stop collar and the guide bushing head, there is provided a chip kicker plate which is slidably mounted on the stop collar and spring loaded to extend past the stop collar's stop face. The chip kicker plate retracts upon engagement with the guide bushing head and kicks and brushes the chips out of the way during retraction to ensure accurate cutting depths.

It is an object of this invention to provide a new and improved releasable cutting stop for cutting tools employing securing means securing the cutting stop to the cutting tool which shear in response to predetermined loading to release the cutting stop.

It is another object of this invention to provide a new and improved chip remover for cutting tools employing a spring loaded chip kicker member rotatable with the cutting tool which retracts upon engagement with a stationary member and kicks and brushes the chips out of the way during retraction.

It is another object of this invention to provide an adjustable cutting stop which is secured to a cutting tool by shear-away means which provide positive stoppage of the cutting tool under normal conditions and shear away upon the cutting tool being force fed past its normal limit to release the cutting stop and provide an audible warning.

It is another object of this invention to provide an adjustable stop collar clamped to a cutting tool by shear-away screws which engage the runout of the cutting tool flutes and shear under abnormal operating conditions to release the stop collar and provide an audible report, and a chip kicker plate slidably supported by the stop collar which is spring loaded to extend past the stop face of the stop collar to kick and brush chips out of the way during cutting operation and retract upon abutment with a stationary stop surface.

These and other objects of the invention will be more apparent from the following description and drawing in which.

Figure 1:
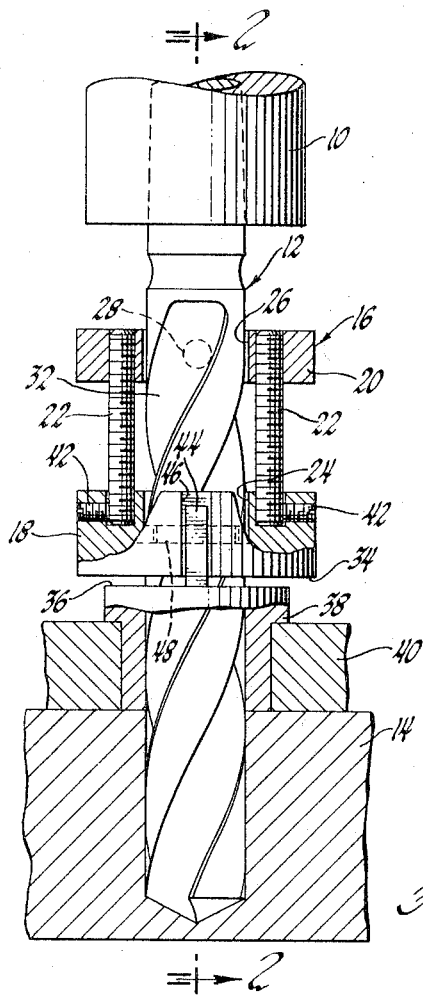
FIGURE 1 is a fragmentary front elevation showing a cutting stop and chip remover assembly embodying features of the invention.
Figure 2:
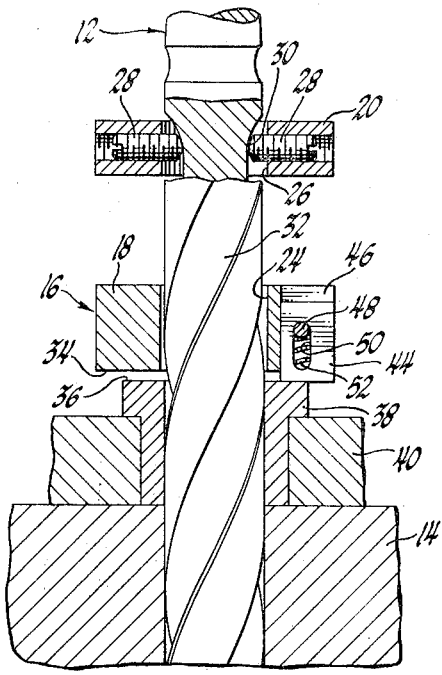
FIGURE 2 is a partial view taken on the line 2—2 in FIGURE 1.

Describing now in detail and first with reference to FIGURES 1 and 2, there is shown a machine collet 10 securely holding a cutting tool such as drill 12, such machine collet being rotatably driven by a suitable power source, not shown, and supported for axial movement whereby the drill 12 during rotational and axial movement is effective to perform a drilling operation on a workpiece 14.

The one embodiment of the cutting stop and chip remover assembly which is generally designated at 16 comprises an adjustable stop collar 18 secured to an anchor collar 20 by two diametrically opposite and parallel adjusting screws 22. Collars 18 and 20 have axially aligned bores 24 and 26 through which the drill 12 extends without contact and the anchor collar 20 is clamped to the drill 12 by a pair of shear-away set screws 28. Screws 28 are threadably received by anchor collar 20 and are threadably adjustable to engage the runout 30 in the flute valley of the double lead drill flutes 32 to prevent axial movement of anchor collar 20 relative to drill 12 in the upward or flute runout direction. The screws 28 are diagonally opposite each other since the flutes 32 are double lead and position the anchor collar 20 concentrically with the drill 12.

The selected depth to be drilled is determined by the position of stop face 34 of stop collar 18 relative to the cutting end of drill 12 and this adjustment is obtained by the operator grasping the exposed portions of screws 22 between the collars and rotating the screws 22 which by the virtue of their threaded engagement with the anchor collar 20 are caused to move axially to relocate their lower ends which abut the ends of the freely fitting closed end bores in stop collar 18. Then, with the lower abutting ends of screws 22 relocated to the selected position, the stop collar 18 is firmly secured to the screws 22 by set screws 42 in stop collar 18 which are advanced into locking frictional engagement with the adjusting screw's lower ends to effectively lock the assembly 16 following this adjustment. Stop face 34 by its engagement with the stationary stop surface 36 provided by the head of a drill guide bushing 38 mounted in a jig fixture 40 for alignment causes positive stoppage of the drill 12 at the preselected drill depth under normal conditions. In the event drill 12 is forcibly fed past the normal limit as the result of operator inadvertence or faulty automatic machine operation, the two shear-away set screws 28 shear with an audible warning report, release the anchor collar 20 and thus the complete assembly 16 from the drill 12 and give the operator time to shutdown before severe damage occurs. The shear-away set screws 28 are designed to shear within a load range determined to be the safety limit for a particular application, such load range being above those loads considered acceptable.

Since the shear-away screws 28 shear to release the assembly 16, the device is failsafe and requires new shear-away screws and setup before continuation of its use thus preventing drilling during maladjustment of the anchor collar 20.

Inaccurate drill depth can occur as a result of an accumulation of chips between the stop face 34 of stop collar 18 and the stationary stop surface 36 of bushing 38. To prevent such chip accumulation, there is provided a chip kicker plate 44 which is slidably mounted in an exterior and axially extending guide slot 46 provided in collar 18. Chip kicker plate 44 is retained in guide slot 46 by a pin 48 which extends through an elongated slot 50 provided in the chip kicker plate 44 such pin being press fitted at its opposite ends in axially aligned bores in the collar 18. The chip kicker plate 44 is guided by the walls of the slot 46 and pin 48, and a prestressed coil spring 52 which engages at opposite ends the pin 48 and the lower end wall of slot 50 normally urges the chip kicker plate 44 downwardly to a position where its lower end extends beyond the stop face 34. As the assembly 16 descends with drill 12, the chip kicker plate 44 eventually engages the stop surface 36, kicks and brushes the chips out from between the stop face 34 and stop surface 36 and retracts upwardly into guide slot 46 while the stop face 34 continues its descent to engage the stop surface 36.

Figure 4:
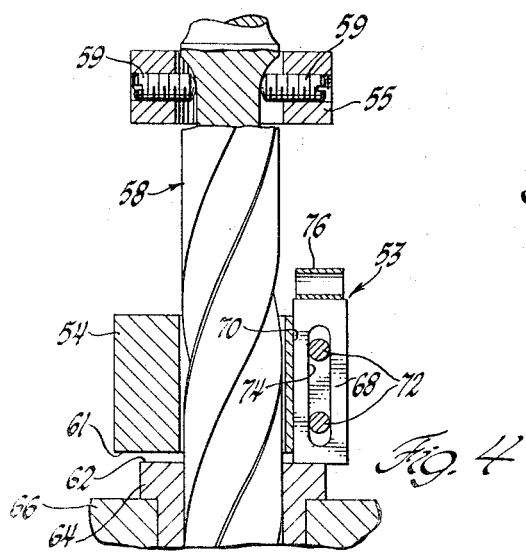
FIGURE 4 is a partial view taken on the line 4—4 in FIGURE 3.
Figure 3:
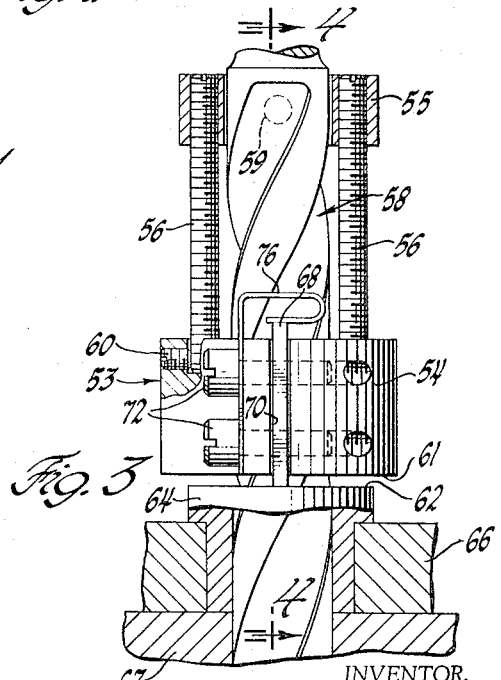
FIGURE 3 is a fragmentary front elevation showing another embodiment of a cutting stop and chip remover assembly embodying features of this invention.

In FIGURES 3 and 4, there is shown another embodiment of my cutting stop and chip remover assembly which is generally designated at 53. Like the assembly 16 shown in FIGURES 1 and 2, there is provided an adjustable stop collar 54 which has a pair of adjusting screws 56 for securing the stop collar 54 to the anchor collar 55, the latter being secured to the drill 58 by shear-away set screws 59 and with set screws 60 being provided in stop collar 54 to lock the adjusting screws in position. The stop face 61 of stop collar 54 is engageable with the stationary stop surface 62 of guide bushing 64 which is supported in the jig fixture 66 located above the workpiece 67 with release of assembly 53, like assembly 16, being effected by the shear-away set screws.

The chip kicker plate 68 is slidably mounted in an exterior and axially extending guide slot 70 provided in the stop collar 54. The chip kicker plate 68 is retained in slot 70 by a pair of screws 72 which pass through an elongated slot 74 in chip kicker plate 68 and are in threaded engagement with the stop collar 54. The screws 72 serve to guide the chip kicker plate in the slot 70 thus preventing transverse movement while permitting movement longitudinally of the drill as best shown in FIGURE 4. Screws 72 also serve to secure a spring member 76 to stop collar 54, such spring member being prestressed and arranged to engage at its free end with the upper end of the chip kicker plate 68 which extends past the upper end face of stop collar 54 so as to hold the upper end wall of slot 74 against the upper screw 72 and the lower end of chip kicker plate 68 normally extended past stop face 60 prior to engagement of the chip kicker plate 68 with stop surface 62. As assembly 53 descends with drill 58, the chip kicker plate 68 eventually engages with the stationary stop surface 62 and the lower end of the chip kicker plate 68 kicks and brushes the chips from between the stop face 60 and stop surface 62 and retracts into the guide slot 70 and against the bias of the spring member 76 as the stop face 60 is brought towards engagement with stop surface 62.

While the cutting stop and chip remover assemblies are shown as being employed with a drill, it will be readily understood that the assembly may be used with other cutting tools such as reamers and taps where accurately controlled cutting depths are required.

The above-described preferred embodiments are illustrative of the invention which may be modified within the scope of the appended claims.

I claim:

1. In combination with a cutting tool having a groove with a runout stop means including a stop collar received on said cutting tool and shear-away means operatively secured to said stop means engaging only the runout of said groove to normally prevent relative movement between said stop collar and said cutting tool and having a shear strength limit less than said cutting tool so that said shear-away means shear in a predetermined load range to release said stop means prior to cutting tool breakage.

2. In combination with a cutting tool having a groove with a runout, stop means for determining cutting tool depth including a stop collar arranged so that said cutting tool extends therethrough and shear-away means operatively secured to said stop means and engaging the runout of said groove to clamp said stop means to said cutting tool and said shear-away means having a load limit less than said cutting tool so that shear-away means shear in a load range below the load limit of said cutting tool to release said stop means.

3. In combination with a cutting tool having a plurality of grooves with runouts, stop means comprising an anchor collar and a stop collar which are received on said cutting tool with the cutting end of the cutting tool extending beyond said stop collar, shear-away screws threadably secured to said anchor collar and engaging the runouts of said grooves whereby said anchor collar is securely clamped to the cutting tool, means rigidly securing said stop collar to said anchor collar including adjusting means operable to adjust said stop collar relative to the cutting end of the cutting tool so as to determine cutting tool deph, and said shear-away screws having a shear stress selected so that said shear-away screws shear in response to a predetermined range of loads acting on said stop collar to release said anchor collar and connected stop collar from the cutting tool.

4. In combination with a cutting tool having a plurality of grooves with runouts, stop means comprising an anchor collar and a stop collar which are received on said cutting tool with the cutting end of said cutting tool projecting beyond said stop collar, shear-away screws threadably secured to said anchor collar and engaging the runouts of said grooves whereby angular movement between said anchor collar and the cutting tool is prevented and movement of the anchor collar in the direction of the runout of the grooves is prevented, a plurality of threaded members extending longitudinally of said cutting tool and being circumferentially spaced thereabout and being threadably secured to said anchor collar, said plurality of threaded members being also operatively connectible to said stop collar so as to rigidly secure said stop collar to said anchor collar, said plurality of threaded members permitting movement of said stop collar relative to the cutting end of the cutting tool so as to adjust for preselected cutting depths of said cutting tool, and said shear-away screws having a shear stress selected so that said shear-away screws shear in response to a predetermined range of loads acting on said stop collar to release said anchor collar and connected stop collar from the cutting tool.

5. In combination with a cutting tool having grooves with runouts, stop means comprising an anchor collar and a stop collar received on the cutting tool, a plurality of threaded members threadably secured to said anchor collar, lock means operable to lock and unlock said threaded members and said stop collar whereby relative movement between said anchor collar and said stop collar is prevented when said threaded members and said stop collar are locked, said plurality of threaded members being operable upon rotation to adjust said stop collar longitudinally along said cutting tool when said threaded members and said stop collar are unlocked, a plurality of shear-away screws threadably secured to said anchor collar and engaging the runouts of said grooves, stop means to normally prevent movement of said stop collar relative to the cutting tool and to shear-away and release said anchor collar and connected stop collar from the cutting tool when a load acting on said stop collar falls within a predetermined load range which is effective to shear said shear-away screws.

6. In combination with a cutting tool, stop means providing a stop face, means operatively connecting said stop means to the cutting tool, a stop surface, said stop face being arranged to engage said stop surface during cutting tool operation so as to limit the cutting depth for the cutting tool, chip remover means comprising a chip kicker plate slidably mounted and retained on said stop means, spring means prestressed to normally urge said chip kicker plate to a fully extended position where a portion of said chip kicker plate extends beyond said stop face so that as said stop face approaches said stop surface, said chip kicker plate is caused to engage said stop surface and is effective to kick and brush any chips cut by the cutting tool from between said stop face and said stop surface with said spring means permitting said chip kicker plate to retract from said fully extended position to enable said stop face and said stop surface to contact.

7. In combination with a cutting tool, a stop collar received on the cutting tool having a stop face and an exterior guide slot, means operatively connecting said stop collar to the cutting tool, a stop surface, said stop face being arranged to engage said stop surface during cutting tool operation so as to limit the cutting depth for the cutting tool, chip remover means comprising a chip kicker plate slidably mounted in the guide slot of said stop collar, said chip kicker plate having an elongated slot, a pin secured to said stop collar extending through the elongated slot of said chip kicker plate, spring means arranged between said slot pin and one end wall of the elongated slot prestressed to normally urge said chip kicker plate to a fully extended position where a portion of said chip kicker plate extends beyond said stop face so that as said stop face approaches said stop surface, said chip kicker plate is caused to engage said stop surface and is effective to kick and brush any chips cut by the cutting tool from between said stop face and said stop surface with said spring means permitting said chip kicker plate to retract from said fully extended position to enable said stop face and said stop surface to contact.

8. In combination with a cutting tool, a stop collar received on the cutting tool having a stop face and an exterior guide slot, means operatively connecting said stop collar to the cutting tool, a stop surface, said stop face being arranged to engage said stop surface during cutting tool operation so as to limit the cutting depth for the cutting tool, chip remover means comprising a chip kicker plate slidably mounted in the guide slot of said stop collar, said chip kicker plate having an elongated slot, a pair of pins secured to said stop collar extending through the elongated slot, spring means secured to said stop collar and arranged to engage said chip kicker plate, said spring means being prestressed to normally urge one end wall of the elongated slot against one of said pins whereby said chip kicker plate is normally held in a fully extended position where a portion of said chip kicker plate extends beyond said stop face so that as said stop face approaches said stop surface, said chip kicker plate is caused to engage said stop surface and is effective to kick and brush any chips cut by the cutting tool from between said stop face and said stop surface with said spring means permitting said chip kicker plate to retract from said fully extended position to enable said stop face and said stop surface to contact.

9. In combination with a cutting tool having a peripheral surface, stop means and shearable clamp means having a load limit less than said cutting tool engaging said peripheral surface under compression to clamp said stop means to said cutting tool and being operable to shear in a selected load range to release said stop means.

10. In combination with a cutting tool having a peripheral surface, stop means and shear-away connecting means having a shear strength less than said cutting tool operatively connecting said stop means to said cutting tool by engaging said peripheral surface under compression to provide the only connection between said stop means and said cutting tool.

11. In combination with a cutting tool having a recessed peripheral surface, stop means and connecting means operatively secured to said stop means having end means engaging the base of said recess to clamp said stop means to said cutting tool and having a load limit less than said cutting tool.

References Cited by the Examiner
UNITED STATES PATENTS

| | | | |
|---|---|---|---|
| 881,075 | 3/1908 | Hosking | 64—28 |
| 1,362,325 | 12/1920 | Kemna | 77—55 |

FRANCIS S. HUSAR, *Primary Examiner.*